(12) United States Patent
Sensui

(10) Patent No.: US 6,545,824 B2
(45) Date of Patent: Apr. 8, 2003

(54) WIDE-ANGLE LENS SYSTEM

(75) Inventor: Takayuki Sensui, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/783,304

(22) Filed: Feb. 15, 2001

(65) Prior Publication Data

US 2001/0028511 A1 Oct. 11, 2001

(30) Foreign Application Priority Data

Feb. 16, 2000 (JP) ........................................ 2000-037785

(51) Int. Cl.$^7$ .............................................. G02B 13/04
(52) U.S. Cl. ...................................... 359/749; 359/751
(58) Field of Search ............................... 359/749–753, 359/680–682, 684

(56) References Cited

U.S. PATENT DOCUMENTS

| | | | | |
|---|---|---|---|---|
| 4,188,092 A | * | 2/1980 | Momiyama | ................. 359/749 |
| 4,437,735 A | * | 3/1984 | Momiyama | ................. 359/749 |
| 4,449,793 A | | 5/1984 | Nakamura et al. | |
| 6,084,719 A | * | 7/2000 | Sugawara et al. | .......... 359/749 |

FOREIGN PATENT DOCUMENTS

| | | |
|---|---|---|
| JP | 55147607 | 11/1980 |
| JP | 57-35821 | 2/1982 |
| JP | 58202414 | 11/1983 |

* cited by examiner

*Primary Examiner*—Scott J. Sugarman
(74) *Attorney, Agent, or Firm*—Greenblum & Bernstein, P.L.C.

(57) ABSTRACT

The improved inner-focus, wide-angle lens system of retro-focus configuration comprises, in order from the object side, a negative first lens group 10, a positive second lens group 20, and a positive third lens group 30 having a diaphragm; the second lens group 20 moves along the optical axis during focusing and the lens system satisfies the following conditions (1) and (2):

$$0.5 < |f_1/f| < 1.2 \quad (1)$$

$$0.7 < f_2/f < 1.8 \quad (2)$$

where f is the focal length of the overall system at focusing at infinity, $f_1$ is the focal length of the first lens group, and $f_2$ is the focal length of the second lens group. The lens system has a half viewing angle of about 44° and an F number of about 3.5.

9 Claims, 6 Drawing Sheets

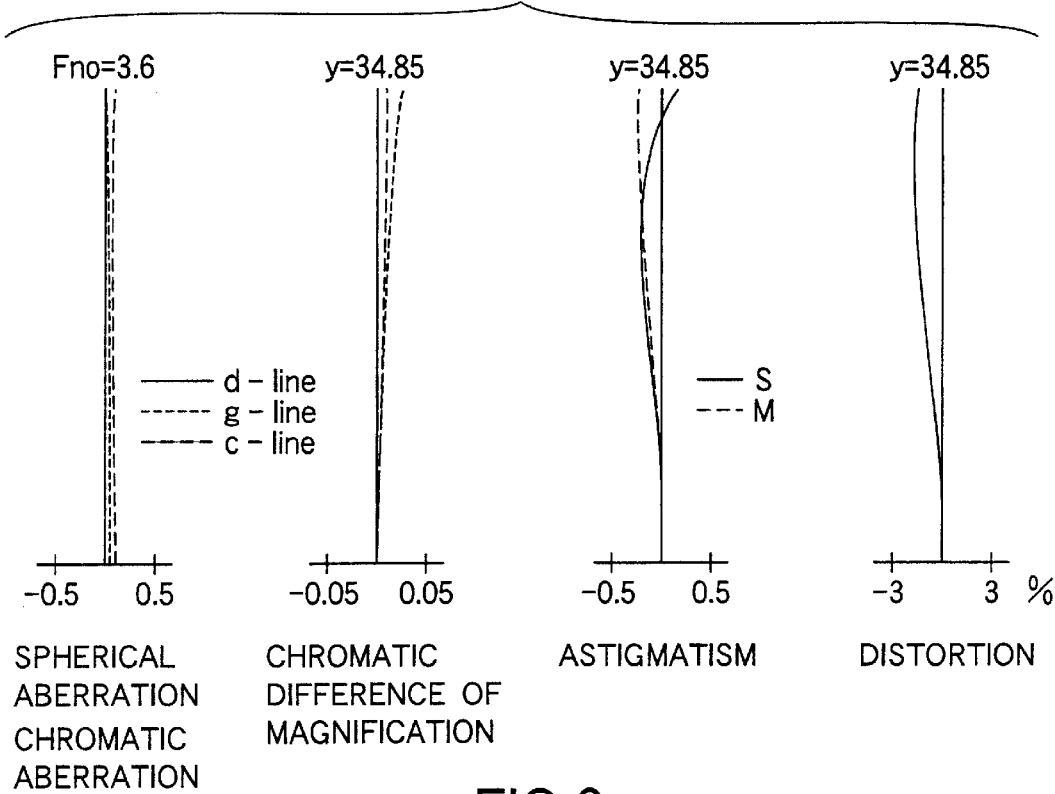
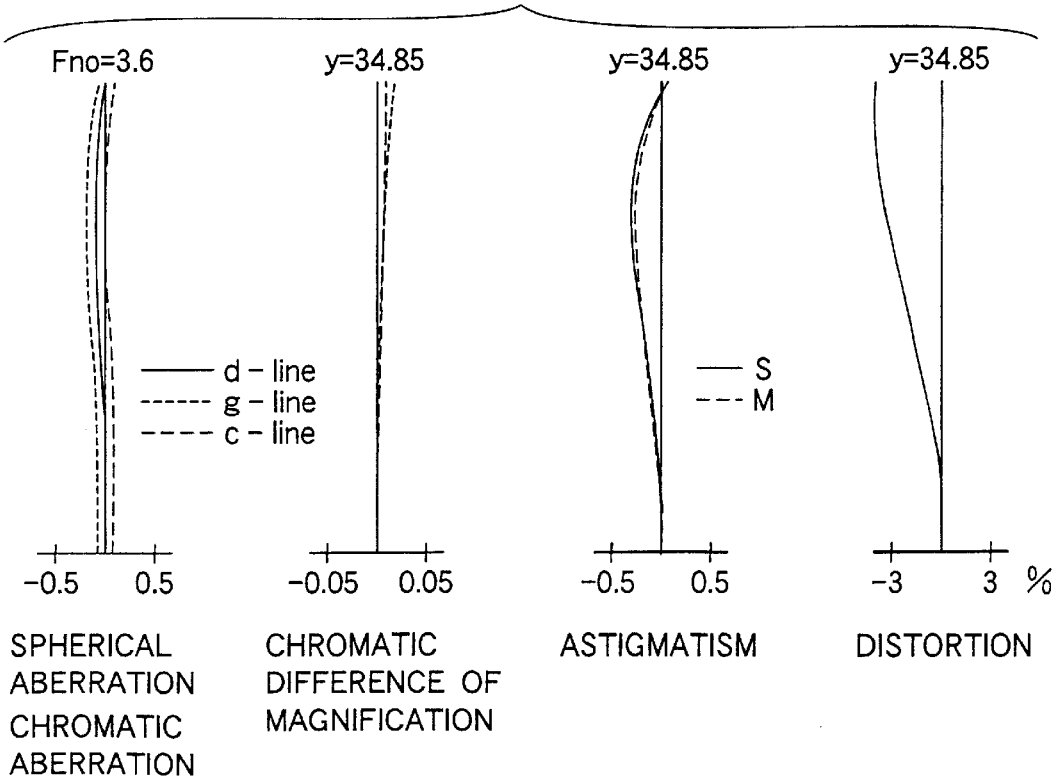

WIDE-ANGLE LENS SYSTEM

BACKGROUND OF THE INVENTION

This invention relates to a wide-angle lens system for use on single-lens reflex cameras.

A single-lens reflex camera has a mirror placed between the lens and the image plane, so the lens system must have a back focal distance longer than a certain value. To meet this need, a wide-angle lens system is usually of a retrofocus type having a longer back focal distance than the focal length. Retrofocus configuration comprises, in order from the object side, a front group having negative refractive power, a diaphragm and a rear group having positive refractive power. The asymmetry of refractive power with respect to the diaphragm contributes to increasing aberrations such as spherical aberration, coma, distortion and astigmatism. In order to correct these aberrations, more lens elements have to be used. However, with the retrofocus configuration, focusing is usually done by extending the overall lens system, so the use of more lens elements increases the weight of the lens groups to be moved and this is unfavorable for the purpose of autofocusing. This weight problem of the focusing lens groups is extremely important with wide-angle lens systems for use in medium-format cameras using Brownies and large-format cameras.

From an autofocusing viewpoint, it is preferred to adopt a lens system that effects focusing by moving only part of the lens groups and those which are of particular advantage are an inner focus and a rear focus system that remain constant in overall length during focusing. However, compared to the type that extends the whole lens groups, the rear focus system suffers from increased aberrational variations during focusing and this phenomenon is particularly noticeable if the rear focus system is used with the retrofocus configuration.

SUMMARY OF THE INVENTION

An object, therefore, of the invention is to provide a three-group, inner-focus, wide-angle lens system of retrofocus configuration that has a half viewing angle of about 44° and an F number of about 3.5.

This object of the invention can be attained by a wide-angle lens system comprising, in order from the object side, a negative first lens group, a positive second lens group, and a positive third lens group having a diaphragm, characterized in that the second lens group moves along the optical axis during focusing and that said lens system satisfies the following conditions (1) and (2):

$$0.5 < |f_1/f| < 1.2 \quad (1)$$

$$0.7 < f_2/f < 1.8 \quad (2)$$

where f is the focal length of the overall system at focusing at infinity, $f_1$ is the focal length of the first lens group, and $f_2$ is the focal length of the second lens group.

Preferably, the wide-angle lens system of the invention further satisfies the following condition (3):

$$2.0 < f_3/f < 7.0 \quad (3)$$

where $f_3$ is the focal length of the third lens group.

In another preferred embodiment, the wide-angle lens system of the invention further satisfies the following condition (4) in addition to the conditions (1)–(3) or the conditions (1) and (2):

$$1.1 < m \cdot f/\Delta X_2 < 2.0 \quad (4)$$

where m is the magnification of the overall system at the closest focusing distance, and $\Delta X_2$ is the total amount of movement the second lens group makes during focusing from infinity to the closest distance.

In yet another preferred embodiment, the wide-angle lens system of the invention further satisfies the following condition (5) in addition to the conditions (1)–(4) or the conditions (1)–(3) or the conditions (1) and (2):

$$1.67 < TL_{12}/TL_3 < 2.8 \quad (5)$$

where $TL_{12}$ is the distance, at focusing at infinity, between the surface of the first lens group which is the closest to the object and the surface of the second lens group which is the closest to the image, and $TL_3$ is the distance between the surface of the third lens group which is the closest to the object and the surface which is the closest to the image.

The present disclosure relates to subject matter contained in Japanese patent application No. 2000-37785 (filed on Feb. 16, 2000), which is expressly incorporated herein by reference in its entirety.

BRIEF DESCRIPTION OF THE DRAWINGS

FIG. 5 is a set of graphs plotting the aberrations that occur to the lens configuration shown in FIG. 4;

FIG. 6 is a set of graphs plotting the aberrations that occur to the lens configuration of Example 2 when it is focused at the closest distance (magnified at −1/10);

DESCRIPTION OF THE PREFERRED EMBODIMENTS

Figure 1:
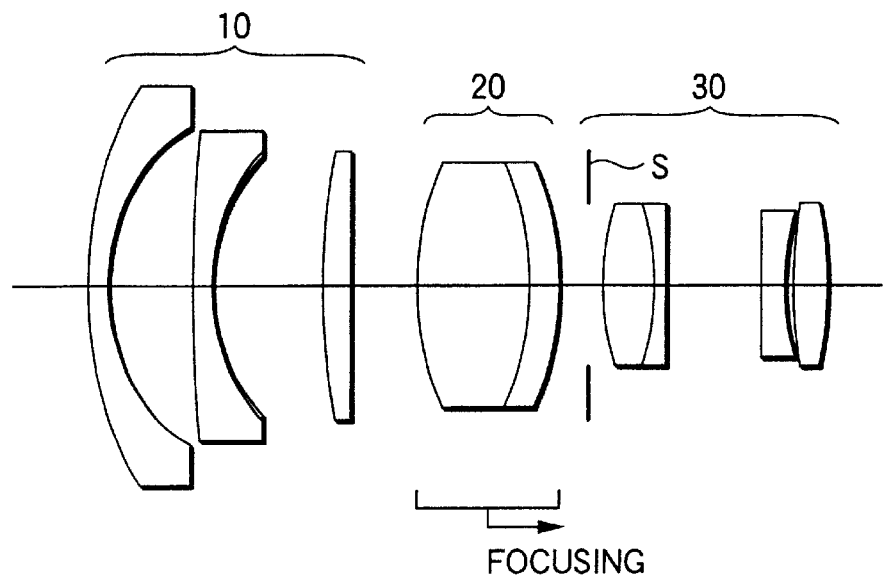
FIG. 1 is a schematic for Example 1 of the wide-angle lens system of the invention as it is focused at infinity.

The wide-angle lens system of the invention is of an inner-focus type designed in retrofocus configuration. As shown in FIGS. 1, 4, 7 and 10, the system comprises, in order from the object side, a negative first lens group 10, a positive second lens group 20, and a positive third lens group 30 having a diaphragm and as the focusing distance changes from infinity to the shortest, the second lens group 20 moves from the object to the image side. The positive second lens group 20 and the positive third lens group 30 may collectively be taken as the positive rear group which is so related to the negative first lens group (front group) 10 that the wide-angle lens system of the invention can be classified as retrofocus configuration. In the embodiments shown in FIGS. 1 and 10, the diaphragm S is positioned in front of the third lens group 30 (i.e., between the second lens group 20 and the third lens group 30) and in the embodiments shown in FIGS. 4 and 7, the diaphragm S is positioned within the third lens group.

Generally speaking of lens systems having a diaphragm in a fixed lens group that is positioned closer to the image than is the lens group that moves during focusing, the F number does not vary upon focusing. This is also true with the wide-angle lens system of the invention which has a diaphragm placed within the fixed third lens group 30 that is positioned closer to the image than is the second lens group 20 which moves during focusing and it has the advantage that the F number does not vary upon focusing.

The condition (1) relates to the power of the negative first lens group. If the power of the first lens group is so strong that the lower limit of the condition (1) is not reached, the overall lens system becomes so much asymmetric with respect to the diaphragm that coma, astigmatism and distortion increase by undesirable degrees. If the power of the first lens group is so weak that the upper limit of the condition (1) is exceeded, the overall lens system becomes insufficiently asymmetric to provide the desired back focal distance.

The condition (2) relates to the power of the positive second lens group. If the power of the second lens group is so strong that the lower limit of the condition (2) is not reached, coma and spherical aberration increase unduly at near distance. If the power of the second lens group is so weak that the upper limit of the condition (2) is exceeded, the amount of lens movement during focusing and, hence, the overall lens length will increase.

The condition (3) relates to the power of the positive third lens group. If the power of the third lens group is so strong that the lower limit of the condition (3) is not reached, either the fore-element diameter increases or the spherical aberration increases by an undesirable degree or the back focal distance becomes insufficient. If the power of the third lens group is so weak that the upper limit of the condition (3) is exceeded, the overall lens length will increase.

The condition (4) relates to the sensitivity of the second lens group to focusing. The greater the value of $f_3/f$, the more sensitive the second lens group is to focusing and the smaller the amount of movement that is necessary to effect focusing up to near distance.

If the second lens group is so sensitive to focusing that the upper limit of the condition (4) is exceeded, coma and spherical aberration will increase by undesirable degrees. If the sensitivity of the second lens group is so low that the lower limit of the condition (4) is not reached, the amount of lens movement during focusing increases so much that the symmetry of the overall lens system is upset at near distance and negative distortion increases.

The condition (5) relates to the ratio between the overall length of the first and second lens groups (i.e., the distance from the surface of the first lens group which is the closest to the object to the surface of the second lens group which is the closest to the image) and the overall length of the third lens group (i.e., the distance from the surface of the third lens group which is the closest to the object to the surface which is the closest to the image).

If the ratio of the total length of the first and second lens groups to that of the third lens group is so large that the upper limit of the condition (5) is exceeded, the first lens group becomes unduly distant from the diaphragm in the third lens group and the fore-element diameter will increase although astigmatism and distortion remain small. If the total length of the first and second lens groups is so short that the lower limit of the condition (5) is not reached, the fore-element diameter can be reduced but aberrations increase by undesirable degrees. In addition, the back focal distance is insufficient.

The following examples are provided for further illustrating the present invention. In the accompanying aberrational diagrams, axial chromatic aberration is expressed in terms of spherical aberration and the d-, g- and C-lines by which the axial chromatic aberration and the chromatic difference of magnification are represented refer to the aberrations at the respective wavelengths; S and M stand for sagittal and meridional, respectively, and y represents image height. The symbols used in Tables 1–4 have the following definitions: $F_{NO}$, F number; f, the focal length of the overall system; M, lateral magnification; W, half viewing angle in degrees; $f_B$, back focal distance; r, radius of curvature; d, lens thickness or air gap between lenses; $N_d$, refractive index at d-line; $\nu$, Abbe number.

Aspheric surfaces of rotation symmetry can be defined by the following formula:

$$X=ch^2/[1+[1-(1+K)c^2h^2]^{1/2}]+A4h^4+A6h^6+A8h^8+A10h^{10}+A12h^{12}\ldots$$

where c is the vertex curvature (1/r) of the conic, h is the height from the optical axis, K is the conic constant, and A4, A6, A8, A10, . . . are the aspheric coefficients of the relevant orders.

EXAMPLE 1

Figure 2:
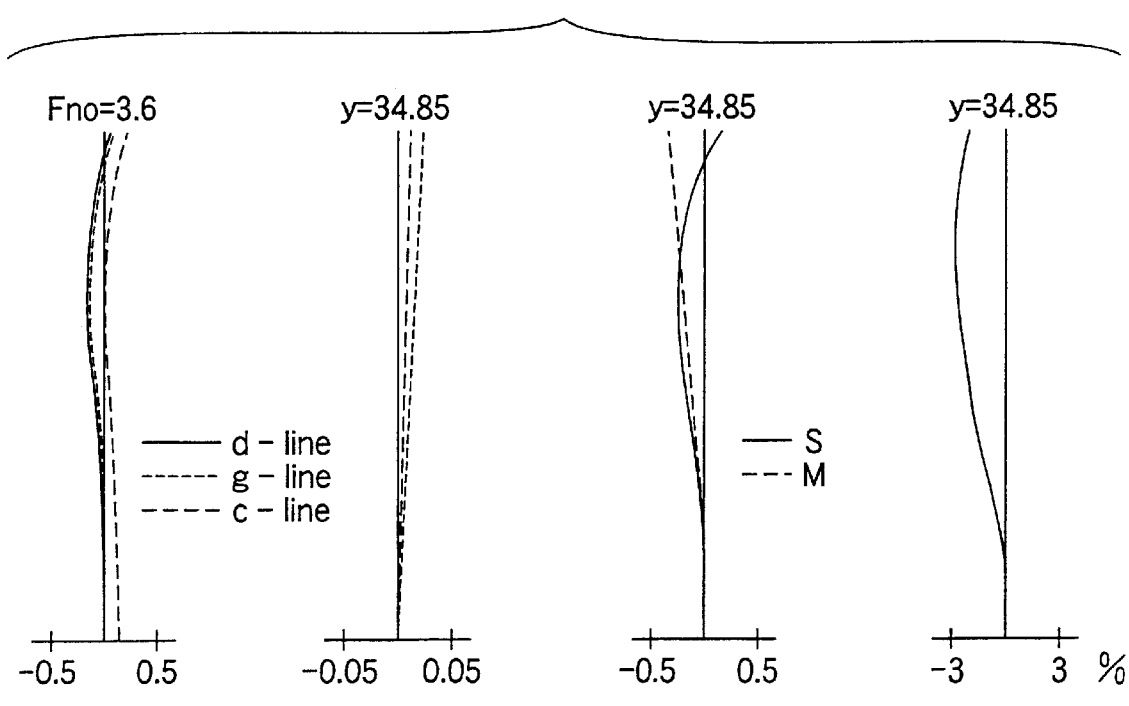
FIG. 2 is a set of graphs plotting the aberrations that occur to the lens configuration shown in FIG. 1.
Figure 3:
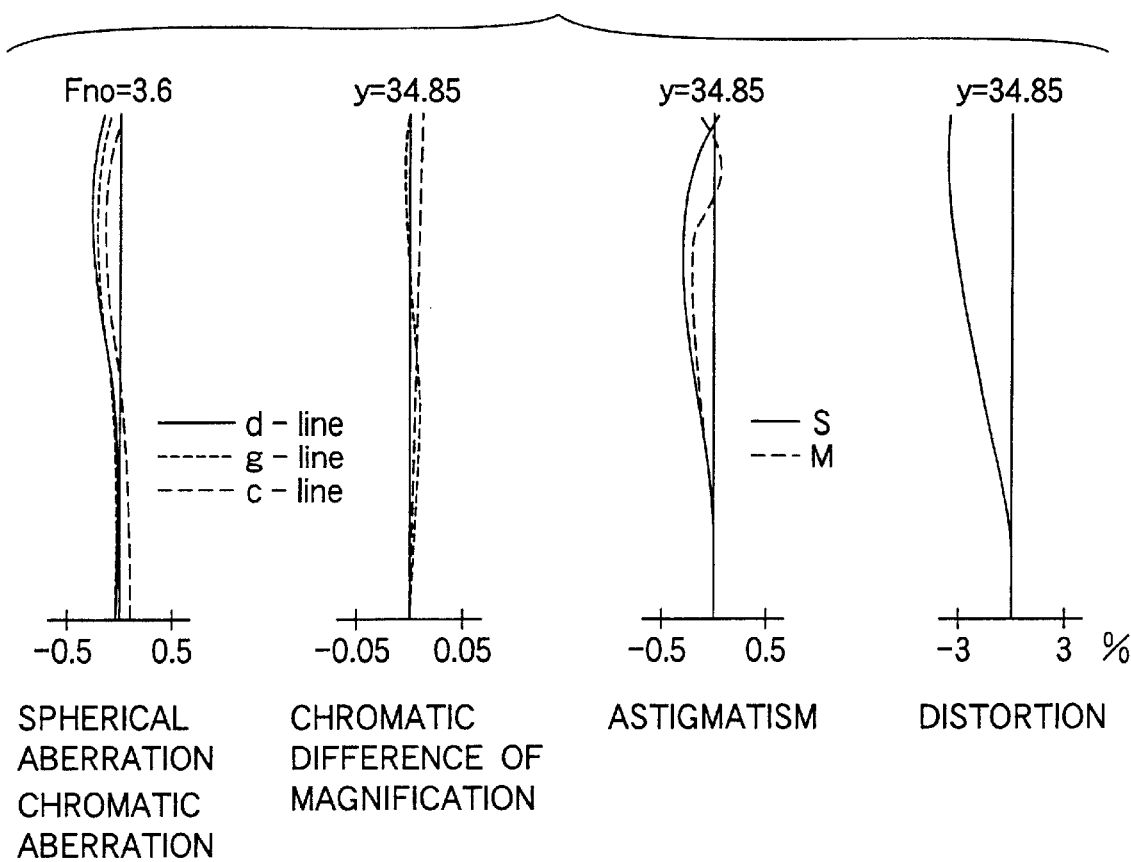
FIG. 3 is a set of graphs plotting the aberrations that occur to the lens configuration of Example 1 when it is focused at the closest distance (magnified at −1/10)

FIG. 1 is a schematic for Example 1 of the wide-angle lens system of the invention as it is focused at infinity; FIG. 2 is a set of graphs plotting the aberrations that occur to this lens configuration when it is focused at infinity; and FIG. 3 is a set of graphs plotting the aberrations that occur to the same lens configuration when it is focused at the closest distance (magnified at −1/10). Table 1 shows numerical data for the respective cases of focusing. The first lens group 10 comprises, in order from the object side, a negative meniscus lens, a negative meniscus lens and a positive lens; the second lens group 20 is a cemented lens which comprises, in order from the object side, a positive lens and a negative lens; the third lens group 30 comprises, in order from the object side, a diaphragm S, a cemented lens consisting of a positive and a negative lens, a negative lens and a positive lens. The negative meniscus lens in the first lens group 10 which is positioned the closer to the image than is the other negative meniscus lens has an aspheric surface on the image side which is made of a synthetic resin layer formed on a glass lens.

TABLE 1

|  | At infinity | At closest distance |
|---|---|---|
| $F_{NO}$ = 1: | 3.6 | 3.6 |
| f = | 35.00 | 32.24 |
| M = | 0.000 | −0.100 |
| $f_B$ = | 58.0 | 58.00 |
| W = 44.88 | | |

TABLE 1-continued

| Surface No. | r | d | Nd | ν |
|---|---|---|---|---|
| 1 | 47.530 | 2.400 | 1.77250 | 49.6 |
| 2 | 24.551 | 10.724 | — | — |
| 3 | 163.125 | 2.400 | 1.80400 | 46.6 |
| 4 | 27.442 | 0.200 | 1.53256 | 45.9 |
| 5* | 22.550 | 13.368 | — | — |
| 6 | 88.687 | 3.488 | 1.84666 | 23.8 |
| 7 | 352.280 | 8.398–10.983 | — | — |
| 8 | 41.972 | 12.623 | 1.53202 | 49.0 |
| 9 | −50.488 | 3.000 | 1.80610 | 40.9 |
| 10 | −61.672 | 6.626–4.041 | — | — |
| Diaphragm | ∞ | 1.700 | — | — |
| 11 | 35.629 | 5.722 | 1.48749 | 70.2 |
| 12 | −36.978 | 1.500 | 1.80147 | 36.0 |
| 13 | 1894.821 | 12.172 | — | — |
| 14 | 108.674 | 3.000 | 1.80518 | 25.4 |
| 15 | 36.129 | 1.080 | — | — |
| 16 | 91.811 | 3.599 | 1.58636 | 60.9 |
| 17* | −45.628 | — | — | — |

The asterisk (*) designates an aspheric surface of rotation symmetry.

Data on aspheric surfaces (A10 and aspheric coefficients of higher orders are 0.00):

| Surface No. | K | A4 | A6 | A8 |
|---|---|---|---|---|
| 5 | −1.00 | −0.9738 × 10$^{-6}$ | −0.4280 × 10$^{-8}$ | −0.5584 × 10$^{-11}$ |
| 17 | 0.00 | 0.5442 × 10$^{-5}$ | 0.4855 × 10$^{-8}$ | 0.7140 × 10$^{-10}$ |

EXAMPLE 2

Figure 4:
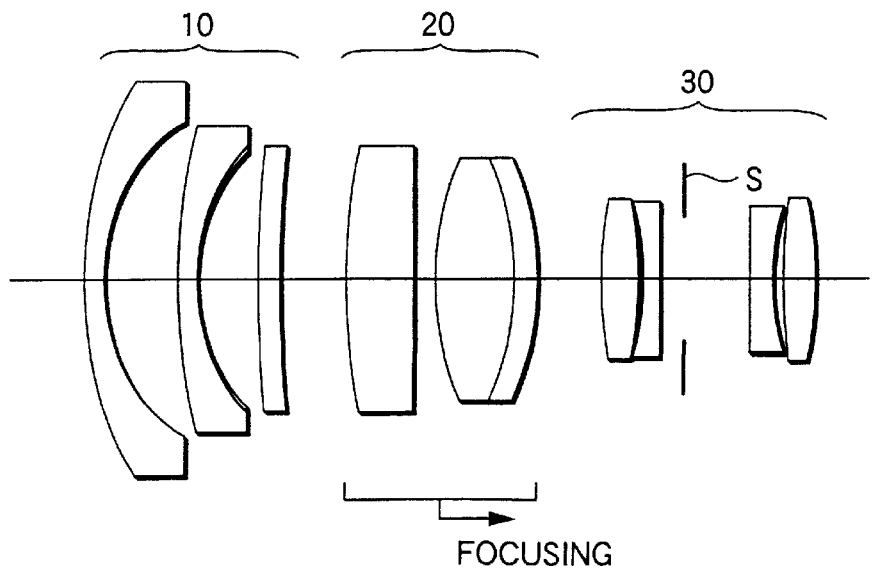
FIG. 4 is a schematic for Example 2 of the wide-angle lens system of the invention as it is focused at infinity.

FIG. 4 is a schematic for Example 2 of the wide-angle lens system of the invention as it is focused at infinity; FIG. 5 is a set of graphs plotting the aberrations that occur to this lens configuration when it is focused at infinity; and FIG. 6 is a set of graphs plotting the aberrations that occur to the same lens configuration when it is focused at the closest distance (magnified at −1/10). Table 2 shows numerical data for the respective cases of focusing. The first lens group 10 comprises, in order from the object side, a negative meniscus lens, a negative meniscus lens and a negative lens; the second lens group 20 comprises, in order from the object side, a positive lens and a cemented lens consisting of a positive lens and a negative lens; the third lens group 30 comprises, in order from the object side, a positive lens, a negative lens, a diaphragm S, a negative lens and a positive lens. The negative meniscus lens in the first lens group 10 which is positioned the closer to the image than is the other negative meniscus lens has an aspheric surface on the image side which is made of a synthetic resin layer formed on a glass lens.

TABLE 2

|  | At infinity | At closest distance |
|---|---|---|
| F$_{NO}$ = 1: | 3.6 | 3.6 |
| f = | 35.35 | 32.43 |
| M = | 0.000 | −0.100 |
| f$_B$ = | 58.0 | 58.00 |
| W = 44.88 | | |

TABLE 2-continued

| Surface No. | r | d | Nd | ν |
|---|---|---|---|---|
| 1 | 62.717 | 2.400 | 1.72916 | 54.7 |
| 2 | 24.747 | 8.970 | — | — |
| 3 | 59.955 | 2.400 | 1.72916 | 54.7 |
| 4 | 24.755 | 0.200 | 1.53256 | 45.9 |
| 5* | 20.868 | 8.459 | — | — |
| 6 | 166.499 | 2.000 | 1.77250 | 49.6 |
| 7 | 109.654 | 9.164–11.073 | — | — |
| 8 | 91.029 | 8.000 | 1.80518 | 25.4 |
| 9 | 2319.019 | 2.569 | — | — |
| 10 | 35.310 | 11.000 | 1.53996 | 59.5 |
| 11 | −29.513 | 2.000 | 1.80100 | 35.0 |
| 12 | −44.821 | 10.964–9.056 | — | — |
| 13 | 110.520 | 3.435 | 1.49700 | 81.6 |
| 14 | −57.660 | 0.580 | — | — |
| 15 | −32.433 | 1.500 | 1.80610 | 33.3 |
| 16 | −194.750 | 2.000 | — | — |
| Diaphragm | ∞ | 7.241 | — | — |
| 17 | 78.614 | 3.000 | 1.80518 | 25.4 |
| 18 | 39.776 | 1.064 | — | — |
| 19 | 102.375 | 3.870 | 1.58636 | 60.9 |
| 20* | −39.580 | — | — | — |

The asterisk (*) designates an aspheric surface of rotation symmetry.

Data on aspheric surfaces (A10 and aspheric coefficients of higher orders are 0.00):

| Surface No. | K | A4 | A6 | A8 |
|---|---|---|---|---|
| 5 | −1.00 | 0.2898 × 10$^{-5}$ | −0.6016 × 10$^{-9}$ | −0.1043 × 10$^{-10}$ |
| 20 | 0.00 | 0.4805 × 10$^{-5}$ | 0.7120 × 10$^{-8}$ | −0.1293 × 10$^{-10}$ |

EXAMPLE 3

Figure 7:
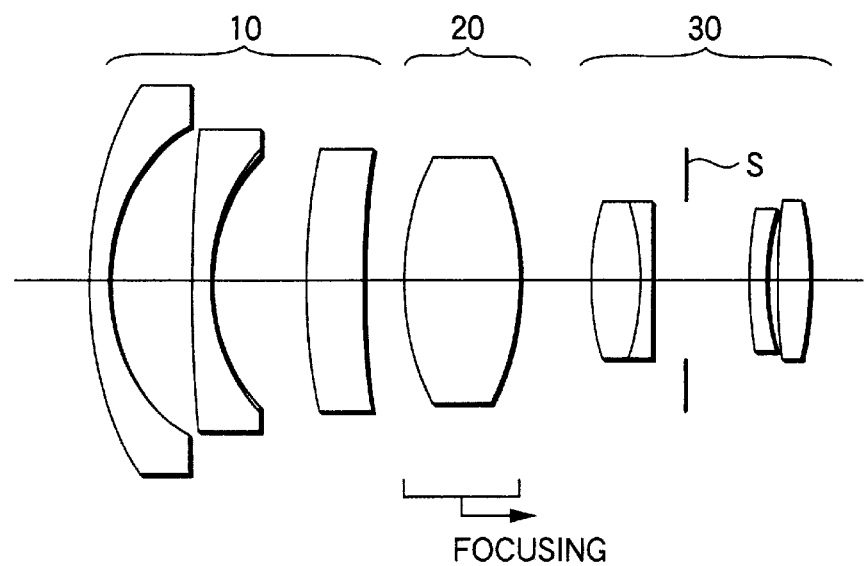
FIG. 7 is a schematic for Example 3 of the wide-angle lens system of the invention as it is focused at infinity.
Figure 8:
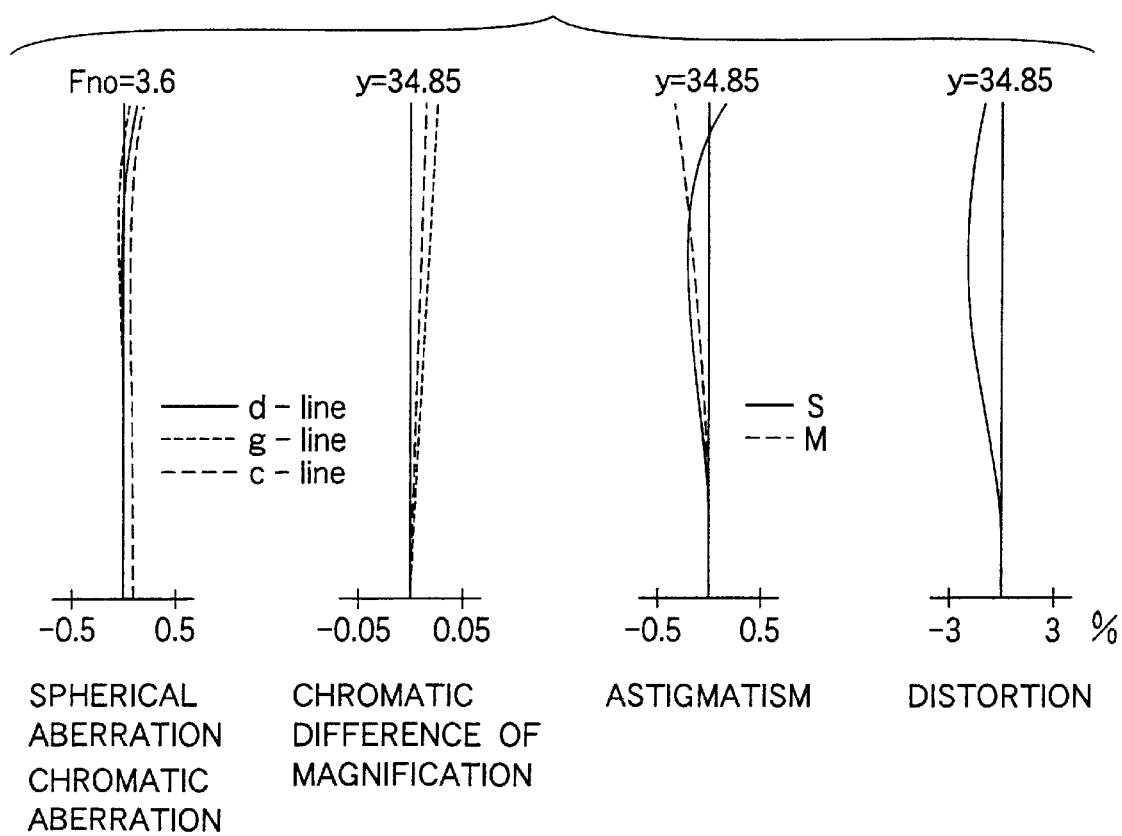
FIG. 8 is a set of graphs plotting the aberrations that occur to the lens configuration shown in FIG. 7.
Figure 9:
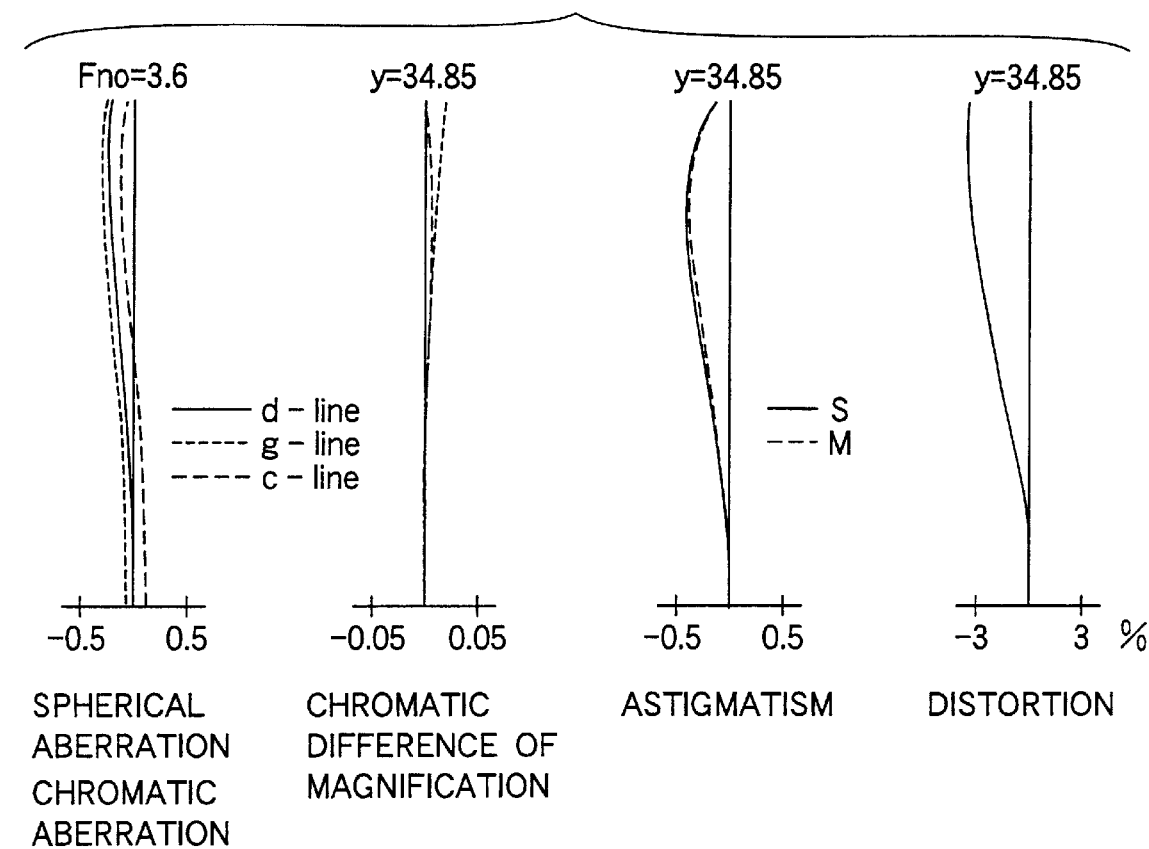
FIG. 9 is a set of graphs plotting the aberrations that occur to the lens configuration of Example 3 when it is focused at the closest distance (magnified at −1/10)

FIG. 7 is a schematic for Example 3 of the wide-angle lens system of the invention as it is focused at infinity; FIG. 8 is a set of graphs plotting the aberrations that occur to this lens configuration when it is focused at infinity; and FIG. 9 is a set of graphs plotting the aberrations that occur to the same lens configuration when it is focused at the closest distance (magnified at −1/10). Table 3 shows numerical data for the respective cases of focusing. The first lens group 10 comprises, in order from the object side, a negative meniscus lens, a negative meniscus lens and a positive lens; the second lens group 20 consists of a single positive lens element; the third lens group 30 comprises, in order from the object side, a cemented lens consisting of a positive and a negative lens, a diaphragm S, a negative lens and a positive lens. The negative meniscus lens in the first lens group 10 which is positioned the closer to the image than is the other negative meniscus lens has an aspheric surface on the image side which is made of a synthetic resin layer formed on a glass lens.

TABLE 3

|  | At infinity | At closest distance |
|---|---|---|
| F$_{NO}$ = 1: | 3.6 | 3.6 |
| f = | 36.00 | 33.29 |
| M = | 0.000 | −0.100 |
| f$_B$ = | 58.0 | 58.00 |
| W = 44.88 | | |

TABLE 3-continued

| Surface No. | r | d | Nd | ν |
|---|---|---|---|---|
| 1 | 51.778 | 2.400 | 1.77250 | 49.6 |
| 2 | 25.452 | 10.698 | — | — |
| 3 | 163.710 | 2.400 | 1.80400 | 46.6 |
| 4 | 26.571 | 0.200 | 1.53256 | 45.9 |
| 5* | 22.112 | 12.719 | — | — |
| 6 | 66.269 | 7.388 | 1.80518 | 25.4 |
| 7 | 199.085 | 4.632–6.788 | — | — |
| 8 | 47.927 | 15.000 | 1.51742 | 52.4 |
| 9 | −54.997 | 8.627–6.201 | — | — |
| 10 | 38.717 | 7.201 | 1.48749 | 70.2 |
| 11 | −34.813 | 1.501 | 1.80100 | 35.0 |
| 12 | −567.660 | 4.462 | — | — |
| Diaphragm | ∞ | 8.849 | — | — |
| 13 | 69.873 | 1.500 | 1.80518 | 25.4 |
| 14 | 33.942 | 1.231 | — | — |
| 15 | 115.692 | 4.462 | 1.58636 | 60.9 |
| 16 | −47.652 | — | — | — |

The asterisk (*) designates an aspheric surface of rotation symmetry.

Data on aspheric surfaces (A10 and aspheric coefficients of higher orders are 0.00):

| Surface No. | K | A4 | A6 | A8 |
|---|---|---|---|---|
| 5 | −1.00 | $0.8510 \times 10^{-6}$ | $-0.4688 \times 10^{-8}$ | $-0.3171 \times 10^{-11}$ |
| 16 | 0.00 | $0.3741 \times 10^{-5}$ | $0.4418 \times 10^{-8}$ | $0.3717 \times 10^{-10}$ |

EXAMPLE 4

Figure 10:
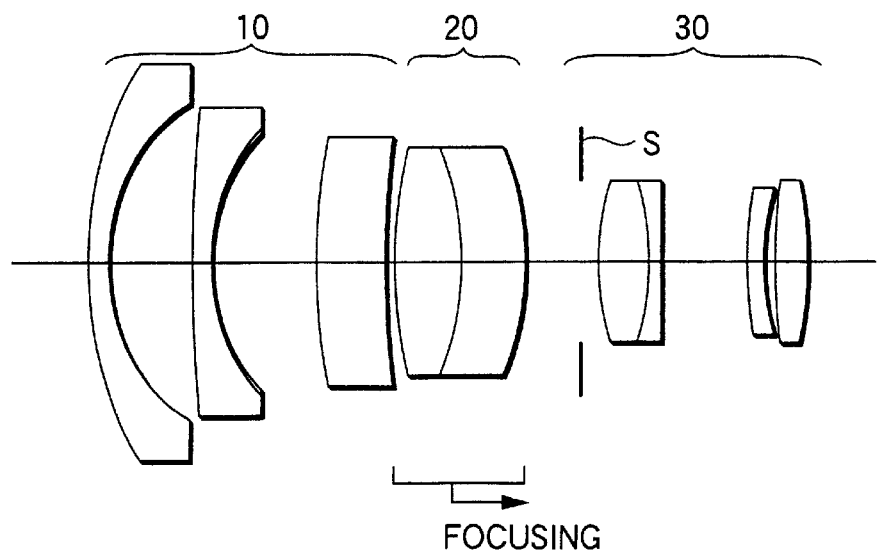
FIG. 10 is a schematic for Example 4 of the wide-angle lens system of the invention as it is focused at infinity.
Figure 11:
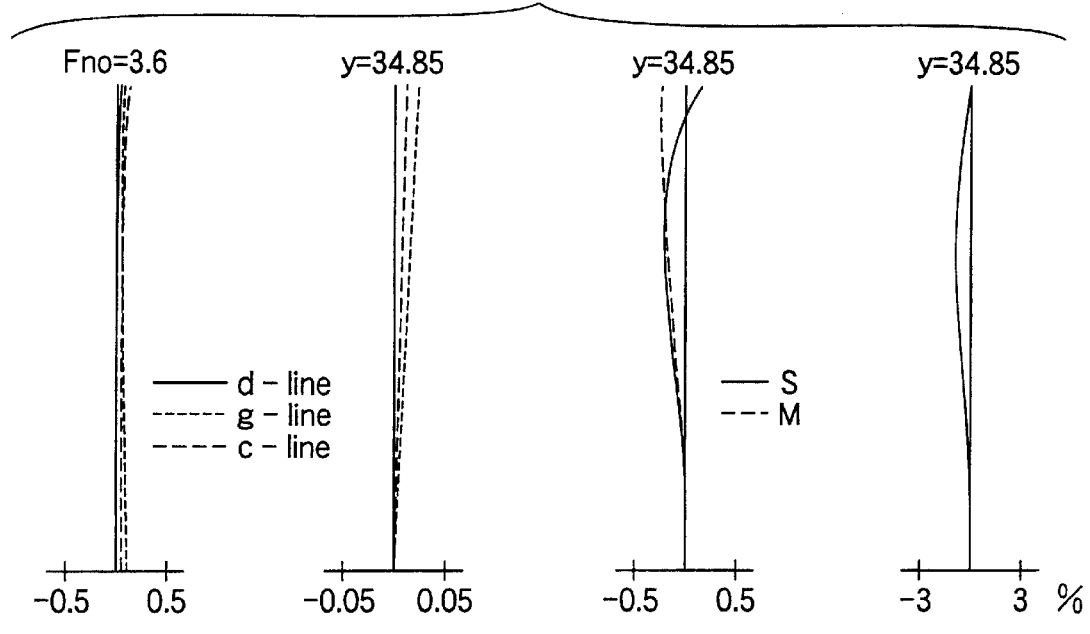
FIG. 11 is a set of graphs plotting the aberrations that occur to the lens configuration shown in FIG. 10.
Figure 12:
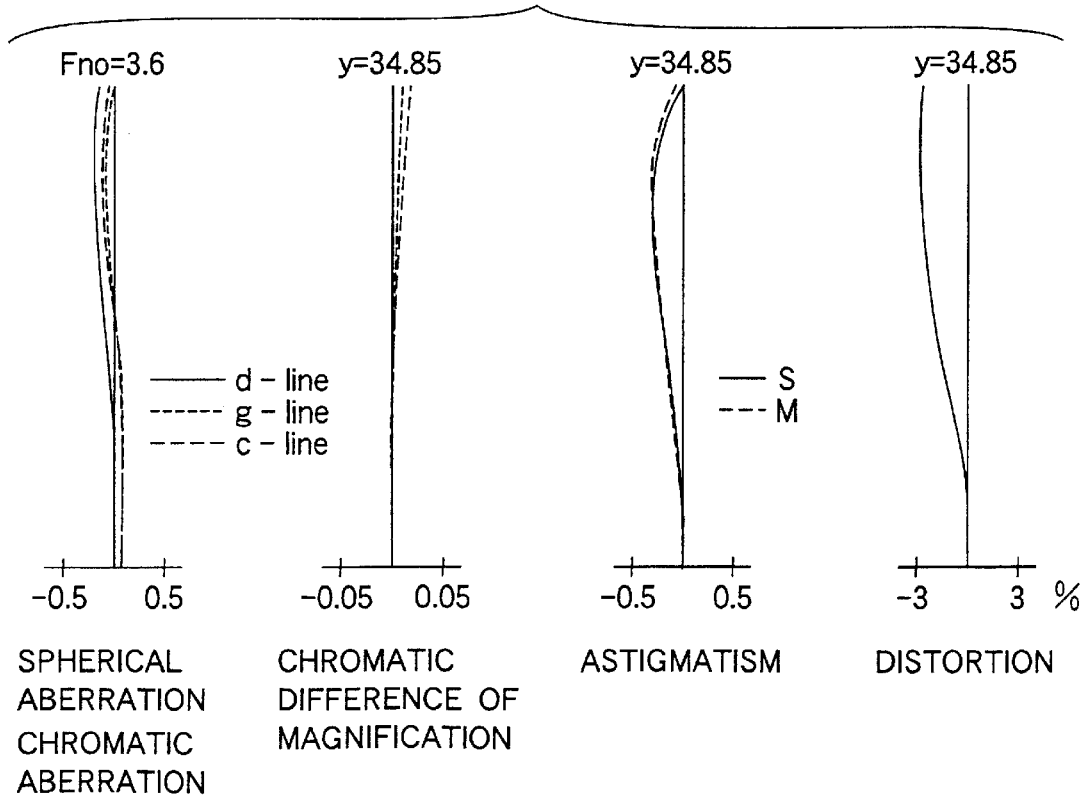
FIG. 12 is a set of graphs plotting the aberrations that occur to the lens configuration of Example 4 when it is focused at the closest distance (magnified at −1/10).

FIG. 10 is a schematic for Example 4 of the wide-angle lens system of the invention as it is focused at infinity; FIG. 11 is a set of graphs plotting the aberrations that occur to this lens configuration when it is focused at infinity; and FIG. 12 is a set of graphs plotting the aberrations that occur to the same lens configuration when it is focused at the closest distance (magnified at −1/10). Table 4 shows numerical data for the respective cases of focusing. The first lens group 10 comprises, in order from the object side, a negative meniscus lens, a negative meniscus lens and a positive lens; the second lens group 20 is a cemented lens which comprises, in order from the object side, a positive lens and a negative lens; the third lens group 30 comprises, in order from the object side, a diaphragm S, a cemented lens consisting of a positive and a negative lens, a negative lens and a positive lens. The negative meniscus lens in the first lens group 10 which is positioned the closer to the image than is the other negative meniscus lens has an aspheric surface on the image side which is made of a synthetic resin layer formed on a glass lens.

TABLE 4

|  | At infinity | At closest distance |
|---|---|---|
| $F_{NO} = 1:$ | 3.6 | 3.6 |
| f = | 36.00 | 32.79 |
| M = | 0.000 | −0.100 |
| $f_B -$ | 58.0 | 58.00 |
| W = 44.88 |  |  |

Data on aspheric surfaces (A10 and aspheric coefficients of higher orders are 0.00):

| Surface No. | K | A4 | A6 | A8 |
|---|---|---|---|---|
| 5 | −1.00 | $0.2456 \times 10^{-5}$ | $-0.3629 \times 10^{-8}$ | $-0.3816 \times 10^{-10}$ |
| 17 | 0.00 | $0.4581 \times 10^{-5}$ | $0.4295 \times 10^{-8}$ | $-0.4153 \times 10^{-10}$ |

The values of $|f_1/f|$, $f_2/f$, $f_3/f$, $m \cdot f/\Delta X2$, and $TL_{12}/TL_3$ were calculated in Examples 1–4 to see if they satisfied the conditions (1)–(5), respectively. The results are shown in Table 5.

TABLE 5

|  | Example 1 | Example 2 | Example 3 | Example 4 |
|---|---|---|---|---|
| Condition (1) | 0.82 | 0.62 | 0.80 | 0.84 |
| Condition (2) | 1.48 | 0.96 | 1.45 | 1.44 |
| Condition (3) | 3.06 | 6.03 | 2.75 | 3.43 |
| Condition (4) | 1.35 | 1.85 | 1.48 | 1.23 |
| Condition (5) | 2.09 | 2.52 | 2.12 | 2.43 |

Obviously, all of the conditions (1)–(5) were satisfied in each Example and aberrations were corrected in a fairly satisfactory manner.

According to the invention, there is provided a three-group, inner-focus, wide-angle lens system of retrofocus configuration that has a half viewing angle of about 44° and an F number of about 3.5.

What is claimed is:

1. A wide-angle lens system comprising, in order from an object side, a negative first lens group, a positive second lens group, and a positive third lens group having a diaphragm, wherein the second lens group moves along an optical axis during focusing and said lens system satisfies the following relationships:

$$0.5 < |f_1/f| < 1.2$$
$$0.7 < f_2/f < 1.8$$

where f is the focal length of the overall system when focusing at infinity, $f_1$ is the focal length of the first lens group, and $f_2$ is the focal length of the second lens group.

2. The wide-angle lens system according to claim 1, which further satisfies the following relationship:

$$2.0 < f_3/f < 7.0$$

where $f_3$ is the focal length of the third lens group.

3. The wide-angle lens system according to claim 1, which further satisfies the following relationship:

$$1.1 < m \cdot f/\Delta X_2 < 2.0$$

where m is the magnification of the overall system at the closest focusing distance, and $\Delta X_2$ is the total amount of movement of the second lens group during focusing from infinity to the closest distance.

4. The wide-angle lens system according to claim 1, wherein said second lens group moves along the optical axis with respect to the first and third lens groups during focusing.

5. A wide-angle lens system comprising, in order from an object side, a negative first lens group, a positive second lens group, and a positive third lens group having a diaphragm, wherein the second lens group moves along the optical axis during focusing and said lens system satisfies the following relationships:

$$0.5<|f_1/f|<1.2$$

$$0.7<f_2/f<1.8$$

$$1.67<TL_{12}/TL_3<2.8$$

where f is the focal length of the overall system when focusing at infinity, $f_1$ is the focal length of the first lens group, $f_2$ is the focal length of the second lens group, $TL_{12}$ is the distance, when focusing at infinity, between the surface of the first lens group which is the closest to the object and the surface of the second lens group which is the closest to the image, and $TL_3$ is the distance between the surface of the third lens group which is the closest to the object and the surface of the third lens group which is the closest to the image.

6. The wide-angle lens system according to claim 5, which further satisfies the following relationship:

$$2.0<f_3/f<7.0$$

where $f_3$ is the focal length of the third lens group.

7. A wide-angle lens system comprising, in order from an object side, a negative first lens group, a positive second lens group, and a positive third lens group having a diaphragm, wherein the second lens group moves along an optical axis during focusing and said lens system satisfies the following relationships:

$$0.5<|f_1/f|<1.2$$

$$0.7<f_2/f<1.8$$

$$1.1<m\cdot f/\Delta X_2<2.0$$

wherein f is the focal length of the overall system when focusing at infinity, $f_1$ is the focal length of the first lens group, and $f_2$ is the focal length of the second lens group, m is the magnification of the overall system at the closest focusing distance, and $\Delta X_2$ is the total amount of movement of the second lens group during focusing from infinity to the closest distance.

8. The wide-angle lens system according to claim 7, which further satisfies the following relationship:

$$2.0<f_3/f<7.0$$

where $f_3$ is the focal length of the third lens group.

9. The wide-angle lens system according to claim 7, wherein said second lens group moves along the optical axis with respect to the first and third lens groups during focusing.

* * * * *